US012726991B2

(12) United States Patent
Li et al.

(10) Patent No.: US 12,726,991 B2
(45) Date of Patent: Sep. 1, 2026

(54) METHOD AND DEVICE FOR SOUNDING REFERENCE SIGNAL FLEXIBILITY ENHANCEMENT

(71) Applicant: ZTE CORPORATION, Shenzhen (CN)

(72) Inventors: Gang Li, Shenzhen (CN); Chuangxin Jiang, Shenzhen (CN); Hao Wu, Shenzhen (CN); Zhaohua Lu, Shenzhen (CN); Shujuan Zhang, Shenzhen (CN); Yuxin Wang, Shenzhen (CN); Zhen He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 539 days.

(21) Appl. No.: 17/869,962

(22) Filed: Jul. 21, 2022

(65) Prior Publication Data

US 2022/0361223 A1 Nov. 10, 2022

Related U.S. Application Data

(63) Continuation of application No. PCT/CN2020/118647, filed on Sep. 29, 2020.

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1812* (2013.01); *H04L 5/0012* (2013.01); *H04L 5/0051* (2013.01); *H04W 72/1263* (2013.01)

(58) Field of Classification Search
CPC .............. H04W 72/23; H04W 72/1263; H04L 1/1812; H04L 5/0012; H04L 5/0051;
(Continued)

(56) References Cited

U.S. PATENT DOCUMENTS 8,891,452 B2 * 11/2014 Nishio .................. H04L 5/0048 370/479
12,408,147 B2 * 9/2025 Kittichokechai ..... H04L 5/0053
(Continued)

FOREIGN PATENT DOCUMENTS

CN 107925544 A 4/2018
CN 109565840 A 4/2019
(Continued)

OTHER PUBLICATIONS

Apple Inc., "Views on Rel-17 SRS enhancement" 3GPP TSG RAN WG1 #102-e, R1-2006504, Aug. 17, 2020, e-Meeting (3 pages).
(Continued)

*Primary Examiner* — Thinh D Tran
(74) *Attorney, Agent, or Firm* — Foley & Lardner LLP

(57) ABSTRACT

Presented are systems and methods for sounding reference signal (SRS) flexibility enhancement. A wireless communication device may receive a configuration of a plurality of SRS parameter sets from a wireless communication node. The plurality of SRS parameter sets may each be associated with a corresponding downlink control information (DCI) related information. The wireless communication device may receive a DCI from the wireless communication node. For a SRS transmission, the wireless communication device may identify a first SRS parameter set associated with first DCI related information identified by the DCI, from the plurality of SRS parameter sets.

19 Claims, 15 Drawing Sheets

900

| HARQ process number (3 bits) | RV (2 bits) | NDI (1 bit) | slot offset value |
|---|---|---|---|
| 000 | 00 | 0 | k1 |
| | | 1 | k2 |
| | 01 | 0 | k3 |
| | | 1 | k4 |
| | 10 | 0 | k5 |
| | | 1 | k6 |
| | 11 | 0 | k7 |
| | | 1 | k8 |
| 001 | 00 | 0 | k9 |
| | | 1 | k10 |
| | 01 | 0 | k11 |
| | | 1 | k12 |
| | 10 | 0 | k13 |
| | | 1 | k14 |
| | 11 | 0 | k15 |
| | | 1 | k16 |
| ... | ... | ... | ... |

(51) Int. Cl.
*H04L 5/00* (2006.01)
*H04W 72/1263* (2023.01)

(58) Field of Classification Search
CPC ... H04L 1/0025; H04L 1/0026; H04L 1/1819; H04L 1/1822; H04L 5/0053
See application file for complete search history.

(56) References Cited

U.S. PATENT DOCUMENTS

| | | | | |
|---|---|---|---|---|
| 2011/0310818 | A1* | 12/2011 | Lin | H04L 5/0048 370/328 |
| 2018/0309496 | A1* | 10/2018 | Lee | H04B 7/0408 |
| 2021/0399840 | A1* | 12/2021 | Yi | H04L 1/0004 |
| 2022/0029861 | A1* | 1/2022 | Shahmohammadian | H04L 5/0048 |
| 2022/0116178 | A1* | 4/2022 | Go | H04L 1/0013 |
| 2022/0201734 | A1* | 6/2022 | Kim | H04W 72/23 |
| 2023/0029850 | A1* | 2/2023 | Park | H04L 1/1854 |
| 2024/0049193 | A1* | 2/2024 | Abdelghaffar | H04W 76/20 |

FOREIGN PATENT DOCUMENTS

| | | | |
|---|---|---|---|
| CN | 109923828 | A | 6/2019 |
| CN | 111130742 | A | 5/2020 |
| CN | 111132319 | A | 5/2020 |
| CN | 111163522 | A | 5/2020 |
| WO | WO-2012/020936 | A2 | 2/2012 |

OTHER PUBLICATIONS

Catt, "Discussion on enhancements on SRS flexibility, coverage and capacity" 3GPP TSG RAN WG1 #102-e, R1-2005688, Aug. 17, 2020, e-Meeting (6 pages).

Cewit et al., "Discussion on enhancement of SRS in Rel. 17 further enhanced MIMO" 3GPP TSG RAN WG1 Meeting #102-e, R1-2006364, Aug. 17, 2020, e-Meeting (5 pages).

Intel Corporation, "Discussion on SRS enhancements" 3GPP TSG RAN WG1 Meeting #102-e, R1-2005863, Aug. 17, 2020, e-Meeting (13 pages).

Interdigital, Inc., "Discussion on SRS Enhancements" 3GPP TSG RAN WG1 #102-e, R1-2005487, Aug. 17, 2020, e-Meeting (5 pages).

International Search Report and Written Opinion for PCT Appl. No. PCT/CN2020/118647, mailed Jun. 30, 2021 (8 pages).

Lenovo et al., "Enhancements on SRS" 3GPP TSG RAN WG1#102-e, R1-2005824, Aug. 17, 2020, e-Meeting (3 pages).

LG Electronics, "Enhancements on SRS flexibility, coverage and capacity" 3GPP TSG RAN WG1 #102-e, R1-2006601, Aug. 17, 2020, e-Meeting (5 pages).

Oppo, "Enhancements on SRS flexibility, coverage and capacity" 3GPP TSG RAN WG1 #102-e, R1-2005988, Aug. 17, 2020, e-Meeting (4 pages).

Qualcomm Incorporated, "Enhancements on SRS flexibility, switching, coverage and capacity" 3GPP TSG-RAN WG1 Meeting #102-e, R1-2006795, Aug. 17, 2020, e-Meeting (27 pages).

Samsung, "Enhancements on SRS" 3GPP TSG RAN WG1 #102-e, R1-2006133, Aug. 17, 2020, e-Meeting (5 pages).

Spreadtrum Communications, "Considerations on SRS enhancement" 3GPP TSG RAN WG1#102-e, R1-2006255, Aug. 17, 2020, e-Meeting (4 pages).

Vivo, "Discussion on SRS enhancement" 3GPP TSG RAN WG1 #102-e, R1-2005368, Aug. 17, 2020, e-Meeting (17 pages).

Zte, "Enhancements on SRS flexibility, coverage and capacity" 3GPP TSG RAN WG1 Meeting #102-e, R1-2005459, Aug. 17, 2020, e-Meeting (10 pages).

Zte, "Enhancements on SRS flexibility, coverage and capacity" 3GPP TSG RAN WG1 Meeting #102-e, R1-2006963, Aug. 17, 2020, e-Meeting (10 pages).

Zte: "Procedure of cross-slot scheduling power saving techniques" 3GPP TSG RAN WG1 #98bis; R1-1910182; Oct. 20, 2019; Chongqing, China (10 pages).

First Office Action on CN Appl. No. 202080102404.5 dated Jan. 27, 2026 (16 pages).

Futurewei, "Enhancements on SRS flexibility, coverage and capacity" 3GPP TSG RAN WG1 #102-e, R1-2005288, Aug. 17, 2020, e-Meeting (7 pages).

* cited by examiner

300

| slot offset 302 | slot0 304 | slot1 306 | slot2 308 | slot3 310 | slot4 312 |
|---|---|---|---|---|---|
| | D | D | D | S | U |
| 0 | | | | PDCCH SRS | |
| 1 | | | PDCCH 314 | SRS 316 | |
| 1 | | | | PDCCH 314 | SRS 316 |
| 2 | | PDCCH 314 | | SRS 316 | |
| 2 | | | PDCCH 314 | | SRS 316 |
| 3 | PDCCH 314 | | | SRS 316 | |
| 3 | | PDCCH 314 | | | SRS 316 |
| 4 | PDCCH 314 | | | | SRS 316 |

| | slot0 | slot1 | slot2 | slot3 | slot4 |
|---|---|---|---|---|---|
| slot offset | D | D | D | S | U |
| 0 | PDCCH 414 | | | SRS 416 | |
| 0 | | PDCCH 414 | | SRS 416 | |
| 0 | | | PDCCH 414 | SRS 416 | |
| 0 | | | | PDCCH SRS | |

| NDI (1 bit) | SRS request field (2 bits) | Trigger state |
|---|---|---|
| 0 | 00 | 0 |
| | 01 | 1 |
| | 10 | 2 |
| | 11 | 3 |
| 1 | 00 | 4 |
| | 01 | 5 |
| | 10 | 6 |
| | 11 | 7 |

| NDI (1 bit) | SRS request field (2 bits) | Trigger state |
| --- | --- | --- |
| 0 | 0 | 0 |
| | 1 | 1 |
| 1 | 0 | 2 |
| | 1 | 3 |

| RV (2 bits) | NDI (1 bit) | SRS request field | Trigger state |
|---|---|---|---|
| 00 | 0 | 00 | 0 |
| | | 01 | 1 |
| | | 10 | 2 |
| | | 11 | 3 |
| | 1 | 00 | 4 |
| | | 01 | 5 |
| | | 10 | 6 |
| | | 11 | 7 |
| 01 | 0 | 00 | 8 |
| | | 01 | 9 |
| | | 10 | 10 |
| | | 11 | 11 |
| | 1 | 00 | 12 |
| | | 01 | 13 |
| | | 10 | 14 |
| | | 11 | 15 |
| ... | ... | ... | ... |

| RV (2 bits) | NDI (1 bit) | slot offset value |
|---|---|---|
| 00 | 0 | k1 |
| | 1 | k2 |
| 01 | 0 | k3 |
| | 1 | k4 |
| 10 | 0 | k5 |
| | 1 | k6 |
| 11 | 0 | k7 |
| | 1 | k8 |

| HARQ process number (3 bits) | RV (2 bits) | NDI (1 bit) | slot offset value |
|---|---|---|---|
| 000 | 00 | 0 | k1 |
| | | 1 | k2 |
| | 01 | 0 | k3 |
| | | 1 | k4 |
| | 10 | 0 | k5 |
| | | 1 | k6 |
| | 11 | 0 | k7 |
| | | 1 | k8 |
| 001 | 00 | 0 | k9 |
| | | 1 | k10 |
| | 01 | 0 | k11 |
| | | 1 | k12 |
| | 10 | 0 | k13 |
| | | 1 | k14 |
| | 11 | 0 | k15 |
| | | 1 | k16 |
| ... | ... | ... | ... |

| HARQ process number (3 bits) | NDI (1 bit) | slot offset value |
|---|---|---|
| 000 | 0 | k1 |
| | 1 | k2 |
| 001 | 0 | k3 |
| | 1 | k4 |
| 010 | 0 | k5 |
| | 1 | k6 |
| 011 | 0 | k7 |
| | 1 | k8 |
| 100 | 0 | k9 |
| | 1 | k10 |

| TDRA (4 bits) | mappingType | time offset k2 between PDCCH and PUSCH | startSymbolAnd Length | SRS slot offset |
|---|---|---|---|---|
| 0 | A | 6 | 50 | t1 |
| 1 | A | 6 | 50 | t2 |
| 2 | A | 7 | 60 | t3 |
| 3 | A | 7 | 60 | t4 |
| ... | ... | ... | ... | ... |

| SRS resource set 0 | | |
| --- | --- | --- |
| | Candidate set 0 | DCI format 0_1 |
| | Candidate set 1 | DCI format 0_2 |
| | Candidate set 2 | DCI format 1_1 |
| | Candidate set 3 | DCI format 1_2 |

METHOD AND DEVICE FOR SOUNDING REFERENCE SIGNAL FLEXIBILITY ENHANCEMENT

CROSS-REFERENCE TO RELATED APPLICATION

This application claims the benefit of priority under 35 U.S.C. § 120 as a continuation of PCT Patent Application No. PCT/CN2020/118647, filed on Sep. 29, 2020, the disclosure of which is incorporated herein by reference in its entirety.

TECHNICAL FIELD

The disclosure relates generally to wireless communications, including but not limited to systems and methods for sounding reference signal (SRS) flexibility enhancement.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a configuration of a plurality of SRS parameter sets from a wireless communication node. The plurality of SRS parameter sets may each be associated with a corresponding downlink control information (DCI) related information. The wireless communication device may receive a DCI from the wireless communication node. For a SRS transmission, the wireless communication device may identify a first SRS parameter set associated with first DCI related information identified by the DCI, from the plurality of SRS parameter sets.

In some embodiments, each of the SRS parameter sets may include a time offset to determine a time interval between the SRS transmission and a physical downlink control channel (PDCCH). In some embodiments, each of the SRS parameter sets may include a time offset to determine a time interval between the SRS transmission and a DCI. In some embodiments, each of the SRS parameter sets may include a time offset to determine a time interval between the SRS transmission and a physical uplink shared channel (PUSCH). In some embodiments, each of the SRS parameter sets may include a time offset to determine a time interval between the SRS transmission and a physical downlink shared channel (PDSCH). In some embodiments, the time offset may be specified by a number of time slots or by a number of symbols.

In some embodiments, the first DCI related information may include at least one of a DCI format, a value of a new data indicator (NDI), a value of a redundancy value (RV), a value of hybrid automatic repeat request (HARM) process number, a value of a time domain resource assignment (TDRA), a value of frequency domain resource assignment (FDRA), or a value of frequency hopping flag, of the DCI. In some embodiments, the wireless communication device may identify one or more SRS resources or SRS resource sets for the SRS transmission according to a value of a SRS request field of the DCI. In some embodiments, uplink transmission of data may not be scheduled by the DCI.

In some embodiments, a bit value of the RV may form a most significant bit (MSB) of the first DCI related information. In some embodiments, a bit value of the NDI may form a least significant bit (LSB) of the first DCI related information. In some embodiments, a bit value of the HARQ process number may form a most significant bit (MSB) of the first DCI related information. In some embodiments, a bit value of the NDI may form a least significant bit (LSB) of the first DCI related information. In some embodiments, an order of bits of the first DCI related information from MSB to LSB may comprise a bit value of the RV, a bit value of the HARQ process number and a bit value of the NDI. In some embodiments, an order of bits of the first DCI related information from MSB to LSB may comprise a bit value of the HARQ process number, a bit value of the RV and a bit value of the NDI. In some embodiments, the wireless communication device may use a default SRS parameter set for the SRS transmission when uplink transmission of data is scheduled by the DCI.

In some embodiments, the first DCI related information may be provided via a DCI field that does not exist simultaneously with at least part of a new data indicator (NDI) in the DCI. In some embodiments, the first DCI related information may be provided via a DCI field that does not exist simultaneously with at least part of a redundancy value (RV) in the DCI. In some embodiments, the first DCI related information may be provided via a DCI field that does not exist simultaneously with at least part of a hybrid automatic repeat request (HARQ) process number in the DCI.

In some embodiments, each SRS parameter set may be associated with a corresponding value of the TDRA or FDRA. In some embodiments, the first SRS parameter set and scheduled information about data transmission, may be jointly indicated by a value of the TDRA or FDRA in the DCI. In some embodiments, a location of the SRS transmission may be associated with a location of a physical uplink shared channel (PUSCH) or physical downlink shared channel (PDSCH) transmission. In some embodiments, the wireless communication device may receive a frequency hopping flag in the DCI from the wireless communication node. In some embodiments, the frequency hopping flag may be indicative of at least one of: a configured SRS repetition factor, or whether SRS frequency hopping in a slot is enabled.

At least one aspect is directed to a system, method, apparatus, or a computer-readable medium. A wireless communication node may send a configuration of a plurality of SRS parameter sets to a wireless communication device. The plurality of SRS parameter sets may each be associated with a corresponding downlink control information (DCI) related information. The wireless communication node may send a DCI to the wireless communication device. For a SRS transmission, the wireless communication node may cause the wireless communication device to identify a first SRS parameter set associated with first DCI related information identified by the DCI, from the plurality of SRS parameter sets.

In some embodiments, each of the SRS parameter sets may include a time offset to determine a time interval between the SRS transmission and a physical downlink control channel (PDCCH). In some embodiments, each of the SRS parameter sets may include a time offset to determine a time interval between the SRS transmission and a DCI. In some embodiments, each of the SRS parameter sets may include a time offset to determine a time interval between the SRS transmission and a physical uplink shared channel (PUSCH). In some embodiments, each of the SRS parameter sets may include a time offset to determine a time interval between the SRS transmission and a physical downlink shared channel (PDSCH). In some embodiments, the time offset may be specified by a number of time slots or by a number of symbols.

In some embodiments, the first DCI related information may include at least one of a DCI format, a value of a new data indicator (NDI), a value of a redundancy value (RV), a value of hybrid automatic repeat request (HARQ) process number, a value of a time domain resource assignment (TDRA), a value of frequency domain resource assignment (FDRA), or a value of frequency hopping flag, of the DCI. In some embodiments, the wireless communication node may cause the wireless communication device to identify one or more SRS resources or SRS resource sets for the SRS transmission according to a value of a SRS request field of the DCI. In some embodiments, uplink transmission of data may not be scheduled by the DCI.

In some embodiments, a bit value of the RV may form a most significant bit (MSB) of the first DCI related information. In some embodiments, a bit value of the NDI may form a least significant bit (LSB) of the first DCI related information. In some embodiments, a bit value of the HARQ process number may form a most significant bit (MSB) of the first DCI related information. In some embodiments, a bit value of the NDI may form a least significant bit (LSB) of the first DCI related information. In some embodiments, an order of bits of the first DCI related information from MSB to LSB may comprise a bit value of the RV, a bit value of the HARQ process number and a bit value of the NDI. In some embodiments, an order of bits of the first DCI related information from MSB to LSB may comprise a bit value of the HARQ process number, a bit value of the RV and a bit value of the NDI. In some embodiments, the wireless communication device may use a default SRS parameter set for the SRS transmission when uplink transmission of data is scheduled by the DCI.

In some embodiments, the first DCI related information may be provided via a DCI field that does not exist simultaneously with at least part of a new data indicator (NDI) in the DCI. In some embodiments, the first DCI related information may be provided via a DCI field that does not exist simultaneously with at least part of a redundancy value (RV) in the DCI. In some embodiments, the first DCI related information may be provided via a DCI field that does not exist simultaneously with at least part of a hybrid automatic repeat request (HARQ) process number in the DCI.

In some embodiments, each SRS parameter set may be associated with a corresponding value of the TDRA or FDRA. In some embodiments, the first SRS parameter set and scheduled information about data transmission, may be jointly indicated by a value of the TDRA or FDRA in the DCI. In some embodiments, a location of the SRS transmission may be associated with a location of a physical uplink shared channel (PUSCH) or physical downlink shared channel (PDSCH) transmission. In some embodiments, the wireless communication node may send a frequency hopping flag in the DCI to the wireless communication device. In some embodiments, the frequency hopping flag may be indicative of at least one of: a configured SRS repetition factor, or whether SRS frequency hopping in a slot is enabled.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 illustrates a table of an example time division duplexing (TDD) slot configuration, in accordance with some embodiments of the present disclosure;

FIG. 4 illustrates example approaches for redefining the value of the slot offset, in accordance with some embodiments of the present disclosure;

FIGS. 5-7 illustrate various approaches for using downlink control information (DCI) to indicate a trigger state, in accordance with some embodiments of the present disclosure;

FIGS. 8-11 illustrate various approaches for using a DCI to identify the value of one or more SRS parameters, in accordance with some embodiments of the present disclosure;

FIG. 14 illustrates example approaches for configuring one or more candidate SRS parameter sets per DCI format, in accordance with some embodiments of the present disclosure.

DETAILED DESCRIPTION

Figure 1:
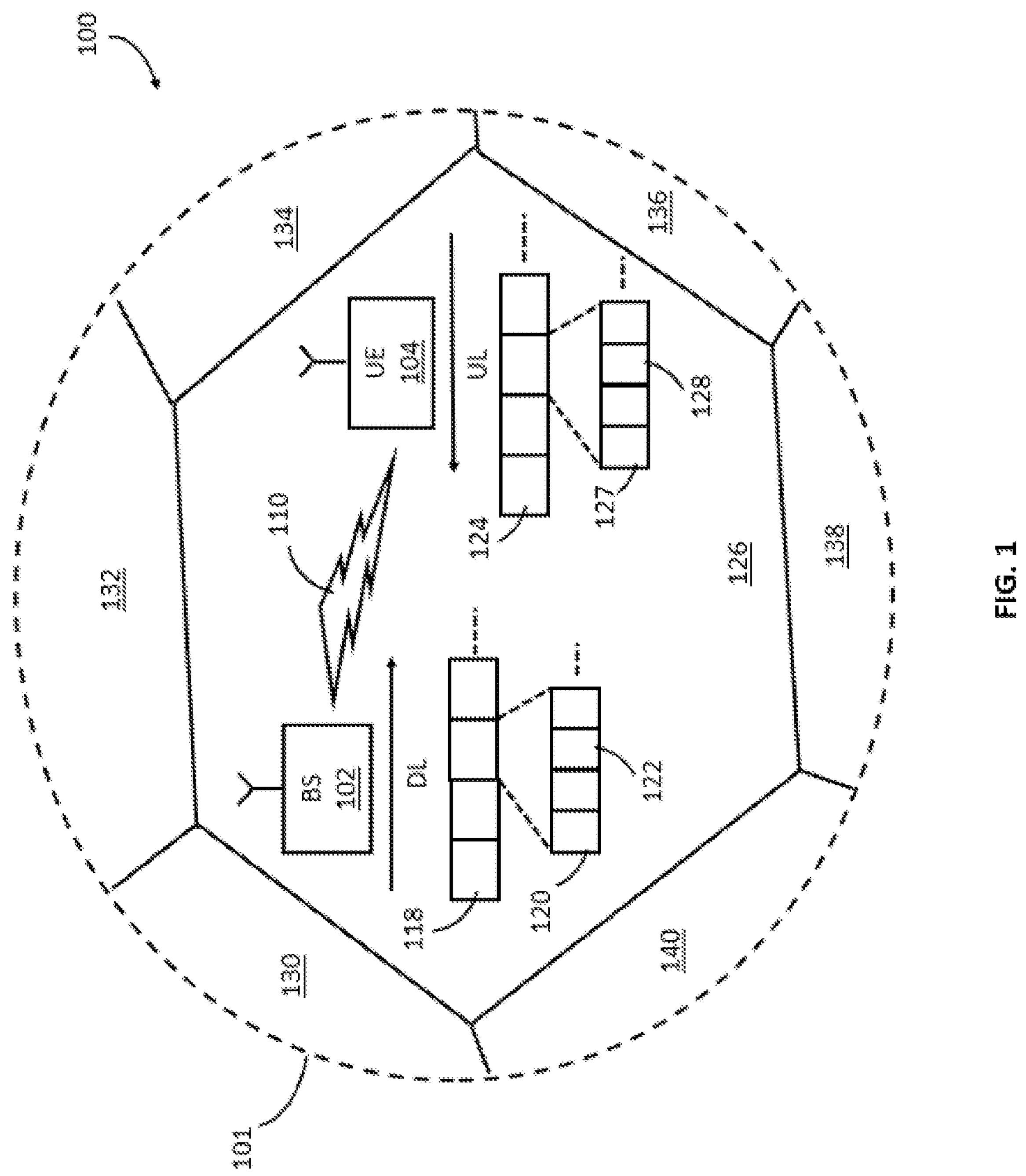
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
|---|---|
| 3GPP | 3rd Generation Partnership Project |
| 5G | 5th Generation Mobile Networks |
| 5G-AN | 5G Access Network |
| 5G gNB | Next Generation NodeB |
| 5G-GUTI 5G- | Globally Unique Temporary UE Identify |
| AF | Application Function |
| AMF | Access and Mobility Management Function |
| AN | Access Network |
| ARP | Allocation and Retention Priority |
| CA | Carrier Aggregation |
| CM | Connected Mode |
| CMR | Channel Measurement Resource |
| CSI | Channel State Information |
| CQI | Channel Quality Indicator |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards Institute |
| FR | Frequency range |
| GBR | Guaranteed Bit Rate |
| GFBR | Guaranteed Flow Bit Rate |
| HARQ | Hybrid Automatic Repeat Request |
| MAC-CE | Medium Access Control (MAC) Control Element (CE) |
| MCS | Modulation and Coding Scheme |
| MBR | Maximum Bit Rate |
| MFBR | Maximum Flow Bit Rate |
| NAS | Non-Access Stratum |
| NF | Network Function |
| NG-RAN | Next Generation Node Radio Access Node |
| NR | New radio |
| NZP | Non-Zero Power |
| OFDM | Orthogonal Frequency-Division Multiplexing |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical uplink control channel |
| PMI | Precoding Matrix Indicator |
| PPCH | Physical Broadcast Channel |
| PRI | PUCCH resource indicator |
| QoS | Quality of Service |
| RAN | Radio Access Network |
| RAN CP | Radio Access Network Control Plane |
| RAT | Radio Access Technology |
| RBG | Resource Block Group |
| RRC | Radio Resource Control |
| RV | Redundant Version |

-continued

| Acronym | Full Name |
|---|---|
| SM NAS | Session Management Non Access Stratum |
| SMF | Session Management Function |
| SRS | Sounding Reference Signal |
| SS | Synchronization Signal |
| SSB | SS/PBCH Block |
| TB | Transport Block |
| TC | Transmission Configuration |
| TCI | Transmission Configuration Indicator |
| TRP | Transmission/Reception Point |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
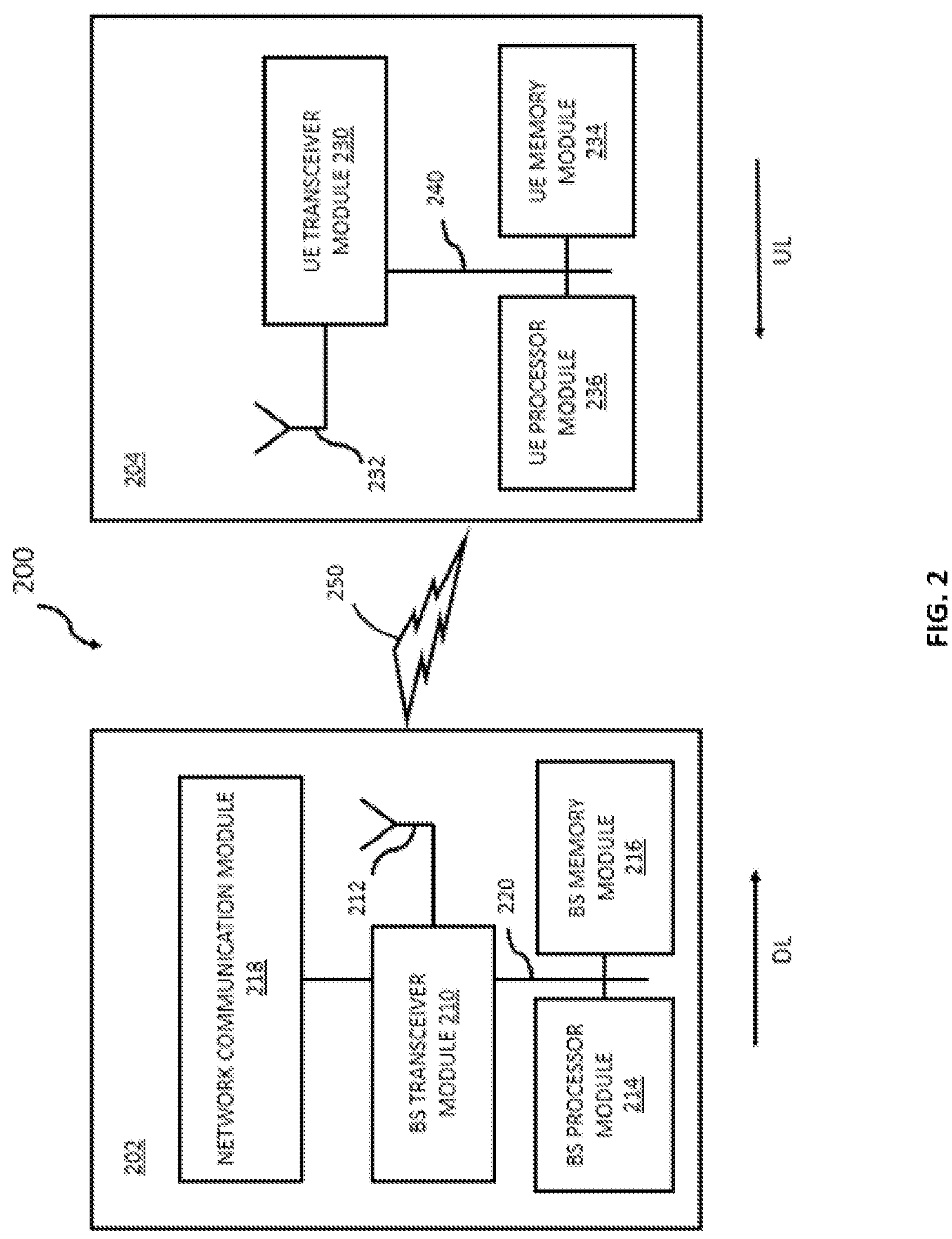
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station)

transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Sounding Reference Signal (SRS) Flexibility Enhancement In certain specifications (e.g., 3GPP specification and/or other specifications), a higher layer configuration can determine or specify one or more parameters of an aperiodic sounding reference signal (SRS) resource and/or a SRS resource set. A wireless communication node (e.g., a ground terminal, a base station, a gNB, an eNB, or a serving node) may be unable to change/modify/adjust the parameter(s) of the aperiodic SRS and/or the SRS resource set if the higher layer configuration determines the SRS parameters (e.g., parameters of the aperiodic SRS, parameters of the SRS resource set, and/or other SRS parameters).

In certain systems (e.g., long term evolution (LTE), new radio (NR) and/or other systems), the SRS may be a common feature. In a wireless communication system, the SRS may be utilized for uplink (UL) and/or downlink (DL) channel measurement. For example, the SRS (and/or other signaling) may be used to acquire/obtain one or more UL channel state measurements and/or other measurements. In certain systems with DL and UL slots in a same frequency band (e.g., time division duplexing (TDD) systems and/or other systems), the SRS can be utilized to acquire one or more DL channel state information (CSI) measurements and/or other measurements.

In some embodiments, the SRS can be transmitted/broadcast/sent according to one or more time domain types, such as a periodic SRS, a semi-persistent SRS, an aperiodic SRS, and/or other types. The time domain type may be configured and/or determined for a SRS resource set, the SRS resource set comprising one or more SRS resources. The SRS resource(s) may comprise one or more frequency-domain and/or time domain resources allocated for the SRS (e.g., a location in the time domain, a location in the frequency-domain, and/or other resources). Radio resource control (RRC) signaling and/or other types of signaling may be used to configure periodic SRS transmissions. In some embodiments, medium access control control element (MAC-CE) signaling (or other types of signaling) may be used to configure/trigger semi-persistent SRS transmissions. One or more SRS configurations may be configured via RRC signaling and/or other types of signaling. The one or more SRS configurations may include frequency resources, time domain resources (e.g., number of orthogonal frequency-division multiplexing (OFDM) symbols), periodicity, time offset (e.g., slot offset), and/or other SRS configurations. In some embodiments, the SRS configurations corresponding to aperiodic SRS transmissions may be configured by using RRC signaling, MAC-CE signaling, and/or other types of signaling. One or more aperiodic SRS transmissions can be activated/triggered/caused by downlink control information (DCI), such as a wireless communication device (e.g., UE) specific DCI and/or a common group DCI.

The aperiodic SRS may provide more flexibility compared to other SRS time domain types, such as the periodic SRS and/or the semi-persistent SRS (e.g., the aperiodic SRS can be used/triggered/caused when necessary). The parameters of the SRS may be configured/determined in each of a plurality of SRS resources and/or SRS resource sets. Therefore, each SRS resource and/or SRS resource set may link/relate/associate to one or more SRS trigger states.

A wireless communication device (e.g., a UE, a terminal, or a served node) may use a SRS request field (or other fields) of the DCI to indicate/provide/specify a value of the SRS trigger state. The value of the SRS trigger state (e.g., indicated by the DCI) may trigger one or more SRS resource sets that are linked/related/associated with the value of the SRS trigger state. For example, RRC signaling (or other types of signaling) may configure five (or other numbers of) aperiodic SRS resource sets (e.g., SRS resource set 0, SRS resource set 1, SRS resource set 2, SRS resource set 3, and SRS resource set 4). Of the five aperiodic SRS resource sets, SRS resource set 0 and/or SRS resource set 2 may be linked/related/associated with a SRS trigger state value of 1, for instance. SRS resource set 1 and/or SRS resource set 3 may correspond to a SRS trigger state value of 2 (or other values), while SRS resource set 4 may be linked to a SRS trigger state value of 3 (or other values). If the SRS request field of the DCI indicates that the value of the SRS trigger state corresponds to 1, the wireless communication node may send/transmit/broadcast SRS resource set 0 and/or SRS resource set 2. If, for instance, the SRS request field indicates that the value of the SRS trigger state corresponds to 2, the wireless communication node may broadcast SRS resource set 1 and/or SRS resource set 3. If the SRS request field specifies that the value of the SRS trigger state corresponds to 3, the wireless communication node may transmit SRS resource set 4. In another example, if the SRS request field indicates that the value of the SRS trigger state corresponds to 0 (or other values), none of the SRS resource sets (e.g., SRS resource set 0, SRS resource set 1, and/or other resource sets) may be transmitted.

In some embodiments, the SRS request field of the DCI may be specified by using at least 2 bits (or other numbers of bits) of the DCI. Therefore, although the SRS request field of the DCI can trigger the SRS resource sets (e.g., linking to a value of the SRS trigger state), higher layer signaling (e.g., RRC signaling and/or MAC-CE signaling) may configure/determine the SRS parameters of the SRS resource sets and/or the SRS parameters of the SRS resources included in the SRS resource sets. The SRS parameters (e.g., of the SRS resource sets and/or the SRS resources) may comprise a time offset (e.g., a number of time slots, a number of symbols, and/or other offsets) between a DCI (or a physical downlink control channel (PDCCH)) and a triggered SRS resource (or SRS resource set), transmissionComb, resourceMapping, freqDomainPosition, freqDomainShift, freqHopping, and/or other parameters of the SRS.

Referring now to FIG. 3, depicted is an example of a TDD slot format or configuration 300. In some embodiments, the TDD slot configuration can include five consecutive slots (e.g., slot 0, slot 1, slot 2, slot 3, and/or slot 4). Columns 304, 306, 308, 310, and 312 of the example TDD slot configuration 300 correspond to an individual slot of the five consecutive slots. Column 302 of the TDD slot format 300 specifies a value of a slot offset between a PDCCH and a SRS transmission. In this example, slot 0, slot 1, and/or slot 2 correspond to DL slots (e.g., D slots) that can support DL symbols (e.g., PDCCH and/or physical downlink shared channel (PDSCH)). Slot 3 may correspond to a special and/or flexible slot (e.g., S slot) that can support DL symbols and/or UL symbols (e.g., PDCCH, SRS, and/or other DL/UL symbols). Slot 4 may correspond to an UL slot (e.g., U slot), the UL slot supporting UL symbols (e.g., SRS and/or physical uplink shared channel (PUSCH)).

In some embodiments, RRC signaling (and/or other types signaling) may be used to configure/determine the value of the slot offset (or other time offsets). If the configured value of the slot offset corresponds to 0, the same slot (e.g., slot 3 and/or other slots that support DL and UL symbols) may be used to transmit/send/broadcast a PDCCH 314 (or other DL channels/symbols) and a triggered SRS 316 (e.g., SRS resource and/or SRS resource set). In the example TDD slot format 300, the PDCCH 314 and/or the SRS 316 can be transmitted in or by using slot 3 (e.g., the S slot). Unless the RRC signaling reconfigures the slot offset value (e.g., from 0 to another value), slot 4 (or other UL slots) may not be available to transmit the SRS 316 and the PDCCH 314.

In another example, if the configured value of the slot offset corresponds to 1, slot 2 and/or slot 3 (or other slots that support DL symbols) can be used to transmit the PDCCH 314. If the PDCCH 314 is transmitted by using slot 2, slot 3 may be utilized to send the SRS 316. If instead the PDCCH 314 uses slot 3, the SRS 316 can be transmitted by using slot 4. The wireless communication device may be unable to trigger the SRS 316 transmission by using slot 0 and/or slot 1 to send/transmit the PDCCH 314 (e.g., the update interval of RRC signaling can be lengthy, which may cause PDCCH congestion).

In some embodiments, the configured value of the slot offset may correspond to a value of 2. If the configured value of the slot offset corresponds to 2, slot 1 and/or slot 2 (or other slots that support DL symbols) can be used to transmit the PDCCH 314. If the PDCCH 314 is transmitted by using slot 1, slot 3 may be utilized to send the SRS 316. If instead the PDCCH 314 uses slot 2, the SRS 316 can be transmitted by using slot 4. In another example, if the configured value of the slot offset corresponds to 3, slot 0 and/or slot 1 can be used to transmit the PDCCH 314. If slot 0 is used to transmit the PDCCH 314, slot 3 may be used to transmit the SRS 316. If the PDCCH 314 is transmitted by using slot 1, the SRS 316 can be transmitted by using slot 4. In some embodiments, the configured value of the slot offset may correspond to a value of 4. If the configured value of the slot offset has a value of 4, slot 0 and slot 4 can be used to transmit the PDCCH 314 and the SRS 316 respectively.

One or more SRS parameters (e.g., a time offset) of a SRS resource and/or SRS resource set may be configured by using higher layer signaling (e.g., RRC signaling). If one or more SRS parameters are configured via higher layer signaling, a DCI may be unable to change/update/adjust/modify the one or more SRS parameters. The current level of SRS flexibility may fail to satisfy the variability in traffic, channel conditions, wireless communication device mobility, and/or other parameters. The systems and methods presented herein include a novel approach for improving/enhancing SRS flexibility by at least 25% (e.g., 35, 45 or other percent) for example.

A. Embodiment 1

Referring now to FIG. 4, depicted is an example approach 400 for redefining the value of the slot offset. In some embodiments, the SRS flexibility can be enhanced by establishing a novel/new/different definition/interpretation of the value of the slot offset (sometimes referred as time offset). For example, the value of the slot offset can be interpreted/defined to indicate the slot offset between a PDCCH 414 transmission (or other DL channels/transmissions) and the $k^{th}$ or $(k+1)^{th}$ slot available for SRS 416 transmission. If the value of the slot offset is configured (e.g., via RRC signaling) to a value of 0, the configured slot offset can be interpreted as indicating that the first available/allowable slot, starting at/from the slot of the PDCCH 414 transmission, can be used to transmit the SRS 416. For instance, if the PDCCH 414 is transmitted by using a DL slot (e.g., slot 0, slot 1, and/or slot 2), the first available slot may correspond to slot 3. Therefore, slot 3 may transmit the SRS 416. An available slot may indicate a slot in which one or more SRS symbols of a SRS resource and/or SRS resource set can be sent/transmitted. Alternatively, an available slot may indicate a slot in which all SRS symbols of a SRS resource or all SRS symbols of all SRS resources within a SRS resource set can be sent/transmitted. If slot offset parameter is configured for each SRS resource, multiple SRS resources within one SRS resource set may have different slot offsets, an available slot may be replaced by a set of available slots which may include one or more slot offsets. In such case, an available slot set may indicate a slot set in which all SRS symbols of all SRS resources within a SRS resource set can be sent/transmitted.

In another example, RRC signaling (or other types of signaling) may be used to configure/determine the value of the slot offset to a value of 1. Therefore, the configured slot offset value can be interpreted as indicating that the second available/allowable slot, starting at/from the slot of the PDCCH 414 transmission, can be used to transmit the SRS 416. If the PDCCH 414 is transmitted by using slot 0 (or other DL slots), the second available slot may correspond to slot 4, for instance. Therefore, slot 4 may transmit/send/broadcast the SRS 416.

In some embodiments, the value of the slot offset can be interpreted/defined as indicating the first available slot after the $k^{th}$ slot from a PDCCH 414 transmission. For example, if the slot offset has a value of k and the PDCCH 414 is transmitted in slot n, the SRS 416 may be transmitted in the first available slot after/starting from slot n+k. Additional interpretations/definitions of the value of the slot offset may be considered. However, some approaches that intend to redefine the value of the slot offset may be unable to provide sufficient SRS flexibility (e.g., up to 2 bits of the DCI are used to indicate the SRS request field). In some embodiments, increasing/expanding the size of the SRS request field of the DCI may improve the SRS flexibility. Combining one or more approaches, such as increasing the size of the SRS request field and/or reinterpreting the value of the slot offset, may further enhance the SRS flexibility. However, combining one or more approaches can result in additional DCI overhead.

In some embodiments, one or more DCI formats (e.g., DCI format 0_1 and/or DCI format 0_2) may be used to trigger/cause an UL data transmission. The one or more DCI formats may include/provide/specify a SRS request field to trigger aperiodic SRS transmissions. In some embodiments, the one or more DCI formats can include/provide/specify a CSI request field to trigger/cause CSI reporting. In some embodiments, DCI format 0_1 and/or DCI format 0_2 may trigger CSI reporting and/or one or more SRS transmissions. Although the DCI formats (e.g., DCI format 0_1 and/or DCI format 0_2) can trigger/cause CSI reporting and/or SRS transmissions, the DCI formats may fail to trigger/cause one or more UL data transmissions. In some embodiments, the value of an uplink shared channel (UL-SCH) indicator of a DCI may correspond to a value of 0 and/or other values (e.g., corresponding to or indicating no UL data transmissions). In another example, the value of a CSI request may correspond to a value other than 0 and/or other values (e.g., has CSI report triggering). If the UL-SCH has a value of 0 and/or the CSI request has a value other than 0, the SRS request field and/or other DCI fields (e.g., new data indicator (NDI), redundancy version (RV), hybrid automatic repeat request (HARQ) process number, and/or other fields) may be used to trigger/cause at least one SRS transmission. Therefore, the SRS request field and/or other DCI fields can be used to indicate/provide/specify a particular SRS trigger state to trigger/cause a transmission corresponding to a SRS resource and/or SRS resource set. The SRS request field and/or other DCI fields may jointly trigger at least one SRS transmission.

Referring now to FIG. 5, depicted is an example approach 500 for using a DCI to indicate a trigger state. In some embodiments, DCIs of DCI format 0_1 and/or DCI format 0_2 can indicate/include a NDI field (or other fields). DCIs of certain DCI formats (e.g., DCI format 0_2) may exclude the HARQ process number field and/or the RV field. Therefore, the NDI field and/or the SRS request field (e.g., at least M bits) can be used/combined to trigger one or more SRS transmissions. The bits of the NDI field (e.g., at least 1 bit) may correspond to the most significant bits (MSB) (e.g., the MSB position of the M bits), while the bits of the SRS request field (e.g., one or more bits) can correspond to the least significant bits (LSB) (e.g., the LSB position of the M bits). Combining the NDI and SRS request fields (e.g., at least 2 bits or other numbers of bits) can extend/increase the number of SRS trigger states from 4 to 8, for example. For instance, up to 4 trigger states can be indicated if the SRS request field (e.g., 2 bits) is used. However, if both the NDI field and the SRS request field are used (e.g., 3 bits), up to 8 trigger states may be specified. In some embodiments, the SRS request field of DCI format 0_1 may use 2 bits (or other numbers), while the SRS request field of DCI format 0_2 may use 1 or 2 bits. If DCI format 0_2 provides 1 bit for the SRS request field, certain trigger states may be unavailable for SRS triggering (e.g., trigger states 2, 3, 6, and/or 7).

Referring now to FIG. 6, depicted is an example approach 600 for using a DCI to indicate a trigger state. In some embodiments, DCIs of certain DCI formats (e.g., DCI format 0_2) may include/use/provide 1 bit to indicate the SRS request field. The DCI may trigger/cause CSI reporting and/or one or more SRS transmissions, but may fail to trigger one or more UL data transmissions (or other transmissions). If the DCI fails to trigger/cause one or more UL data transmissions, the NDI field (e.g., at least 1 bit) and/or the SRS request field (e.g., at least 1 bit) may indicate at least one of four trigger states (e.g., trigger states 0, 1, 2, and/or 3). For example, if the NDI field has a value of 1 and the SRS request field has a value of 0, the NDI and SRS request fields may jointly indicate a trigger state value of 2. In another example, if the NDI field has a value of 0 and the SRS request field has value of 1, the NDI and SRS request fields can be combined to indicate trigger state value of 1. In some embodiments, the bit value of the NDI field may correspond to the MSB (or other locations), while the bit value of the SRS request field can correspond to the LSB (or other locations).

Referring now to FIG. 7, depicted is an example approach 700 for using a DCI to indicate a trigger state. In some embodiments, the RV, the HARQ process number, the NDI, and/or the SRS request field can be used to indicate one or more trigger states (e.g., trigger states 0, 1, 2, 3, and/or other trigger states). For example, the RV (e.g., 2 bits or other numbers of bits), the NDI (e.g., 1 bit), and/or the SRS request field (e.g., 2 bits) may be combined/used to specify one or more trigger states. If, for instance, the RV has a value of 01, the NDI has a value of 0, and the SRS request field has a value of 01, each of the values may jointly indicate trigger state value of 9. Combining the RV (e.g., 2 bits), the NDI (e.g., 1 bit) and/or the SRS request (e.g., 2 bits) fields can extend/increase the number of SRS trigger states to 32, for example. The bit values of the RV, the NDI, and/or the SRS request field may be ordered from MSB to LSB, where the bit value of the RV (or other DCI fields) corresponds to the MSB, the bit value of the SRS request field (or other DCI fields) corresponds to the LSB, and the bit value of the NDI (or other DCI fields) is located between the MSB and the LSB. The bit values of the RV, the NDI, the SRS request field, and/or the HARQ process number can be ordered in one or more sequences from MSB to LSB. In some embodiments, the HARQ process number, the NDI field, and/or the SRS request field may be used/combined to trigger one or more SRS transmissions (e.g., indicate one or more trigger states). The bit value of the HARQ process number (or other DCI fields) may correspond to the MSB, while the bit value of the SRS request field (or other DCI fields) may correspond to the LSB. The bit value of the NDI field (or other DCI fields) may be located between the MSB and the LSB. In some embodiments, the HARQ process number, the NDI field, the RV, and/or the SRS request field may be used/combined to trigger one or more SRS transmissions (e.g., indicate one or more trigger states). The bit value of the HARQ process number, the RV, and/or other DCI fields may correspond to the MSB. The bit value of the SRS request and/or other DCI fields may correspond to the LSB. The bit value of the HARQ process number, the RV, the NDI, and/or other DCI fields may be located between the MSB and the LSB. In some embodiments, higher layer signaling (e.g., RRC signaling) may be used to configure the order of the DCI fields (e.g., from MSB to LSB).

In some embodiments, one or more SRS transmissions (e.g., SRS resource and/or SRS resource set) can be related/associated/linked to one or more DCI fields, such as the SRS request field, the HARQ process number, the RV, and/or the NDI. In certain specifications, the SRS request field can be extended (e.g., excluding the bit for the non-supplementary uplink (SUL)/SUL indicator) from X1 bits (e.g., X1=2 bits in DCI format 0_1 and/or X1=0, 1, or 2 bits in DCI format 0_2) to M bits. If the UL-SCH indicator of the DCI has a value of 0 (e.g., no UL data transmission), M may be greater than X1. Therefore, one or more DCI fields (e.g., the RV, the HARQ process number, and/or the NDI) may be removed/eliminated to maintain the size of the DCI less than or equal to legacy one. For instance, if M is greater than X1, one or more DCI fields (e.g., the RV, the HARQ process number, and/or the NDI) may be excluded/removed from the DCI. Therefore, M-X1 may be less than or equal to the number of bits of the DCI fields (e.g., the RV, the HARQ process number, and/or the NDI).

If the number of trigger states increases (e.g., by combining the information of one or more DCI fields), each SRS resource and/or SRS resource set can be linked/associated/related to additional trigger states, therefore increasing/enhancing/improving the SRS flexibility. For example, two SRS resource sets (e.g., resource set 1 and/or resource set 2) may be configured with the same SRS parameters other than the slot offsets (or other time offsets). A first SRS resource set (e.g., resource set 1 configured with a slot offset of k1) may be linked/associated to SRS trigger state 1. The other SRS resource set (e.g., resource set 2 configured with a slot offset of k2) may be linked/associated to SRS trigger state 2. A PDCCH (or other DL channels/transmissions) in slot n can trigger/cause the first SRS resource set (e.g., resource set 1) in slot n+k1 by using a SRS request value of 1. The PDCCH in slot n can trigger/cause the other SRS resource set (e.g., resource set 2) in slot n+k2 by using a SRS request value of 2. In some embodiments, expanding the number of SRS trigger states can increase the number of SRS resources and/or SRS resource sets.

B. Embodiment 2

In some embodiments, the UL-SCH indicator of the DCI may have a value of 0 (e.g., indicating no UL data transmission). If the UL-SCH indicator has a value of 0, higher layer signaling (e.g., RRC signaling, MAC-CE signaling, and/or other types of signaling) may configure one or more candidate values for one or more SRS parameters (e.g., a time offset). For example, one or more candidate values for the slot offset (or other time offsets) may be configured (e.g., via RRC signaling) for one or more SRS resources and/or SRS resource sets. The NDI, the RV, the HARQ process number, and/or other DCI fields may provide values that can be used to select/determine/identify/specify at least one slot offset value from the candidate values. The SRS request field (or other DCI fields) may provide values that can specify/indicate which SRS resources and/or SRS resource sets are triggered/transmitted.

Referring now to FIG. 8, depicted is an example approach 800 for using a DCI to identify the value of one or more SRS parameters. For example, RRC signaling (or other types of signaling) may configure eight candidate values (e.g., k1, k2, k3, k4, k5, k6, k7, and/or k8) for the slot offset of a SRS resource and/or SRS resource set. One or more fields of the DCI (e.g., the RV and/or the NDI) can be used to indicate/select/specify a slot offset value from the eight candidate values. For example, if the RV (e.g., 2 bits or other bits) has a bit value of 01 and the NDI (e.g., 1 bit or other bits) has a bit value of 0, the RV and the NDI may jointly indicate a slot offset value of k3. In another example, if the RV has a bit value of 10 and the NDI has a bit value of 1, the RV and the NDI may specify a slot offset value of k6. The bit value of the RV (or other DCI fields) may correspond to the MSB (or other locations), while the bit value of the NDI (or other DCI fields) may correspond to the LSB (or other locations). In other words, the bit order from MSB to LSB are RV field, NDI field for SRS. In some embodiments, the SRS request field of the DCI may indicate/specify a particular SRS resource and/or SRS resource set.

Referring now to FIG. 9, depicted is an example approach 900 for using a DCI to identify the value of one or more SRS parameters. Besides slot offset, the one or more SRS parameters can include some parameters to inform SRS frequency position, bandwidth, and/or other parameters. For example, the one or more SRS parameters may include transmissionComb, resourceMapping, freqDomainPosition, freqDomainShift, freqHopping, and/or other parameters of the SRS. In some embodiments, one or more fields of the DCI (e.g., the RV, the NDI and/or the HARQ process number) can be used to indicate/select/specify a slot offset value from a plurality of candidate values (e.g., 64 candidate values). For example, if the RV (e.g., 2 bits or other bits) has a bit value of 01, the NDI (e.g., 1 bit or other bits) has a bit value of 0, and the HARQ process number (e.g., 3 bits or other bits) has a bit value of 001, the combined DCI fields may jointly indicate a slot offset value of k11. In another example, if the RV has a bit value of 10, the NDI has a bit value of 1 and the HARQ process number has a bit value of 001, the combined DCI fields may provide an indication/value to specify a slot offset value of k14. In some embodiments, the bit value of the RV and/or HARQ process number (or other DCI fields) forms a MSB of the DCI related information, while the bit value of the NDI (or other DCI fields) forms a LSB of the DCI related information. In some embodiments, an order of bits of the DCI related information from MSB to LSB comprises a bit value of the RV, a bit value of the HARQ process number and a bit value of the NDI. In some embodiments, an order of bits of the DCI related information from MSB to LSB comprises a bit value of the HARQ process number, a bit value of the RV and a bit value of the NDI. In other words, the order of NDI, RV and HARQ process number bits can be a combination field such as (HARQ process number, RV, NDI) or (RV, HARQ process number, NDI).

If the NDI, the RV, and/or the HARQ process number are excluded from the DCI, one or more candidate values of one or more SRS parameters may be unavailable. For example, if the RV field is excluded from the DCI, the bit value of the RV field can be assumed to correspond to 00 (or other bit values). Therefore, slot offset values corresponding to RV bit values of 01, 10, and/or 11 (e.g., k3, k4, k5 and/or other slot offset values) may be unavailable/invalid. One or more slot offset values indicated by using an RV bit value of 00 (e.g., k1, k2, k9, k10, and/or other slot values) may be available/valid.

Referring now to FIG. 10, depicted is an example approach 1000 for using a DCI to identify the value of one or more SRS parameters. In some embodiments, one or more DCI fields (e.g., the NDI, the RV, and/or the HARQ process numbers) may be excluded from the DCI. If at least one DCI field (e.g., the RV) is excluded from the DCI, the bits corresponding to the excluded DCI field(s) may not be considered when selecting a value (e.g., from one or more candidate values) for a SRS parameter (e.g., a time offset). For example, if the RV is excluded from the DCI, the HARQ process number (e.g., 3 bits) and/or the NDI (e.g., 1 bit) can be used to select/identify a slot offset value from a list of candidate values. For example, if the NDI has a bit value of 0 and the HARQ process number has a bit value of 001, the combined DCI fields may jointly indicate a slot offset value of k3.

In some embodiments, the NDI (or other DCI fields) can be used to extend/increase the SRS triggering states. In some embodiments, the RV, the HARQ process number, and/or other DCI fields may be used to select/identify/specify at least one of a plurality of configured candidate values for one or more SRS parameters (e.g., a slot offset value). If the DCI triggers/schedules UL data, the first (or others) of the plurality of configured candidate values (e.g., for one or more SRS parameters) may be used/selected (e.g., by default). In some embodiments, a novel/additional/new DCI field can be defined to select at least one of a plurality of configured candidate values for one or more SRS parameters. If a new DCI field is defined, one or more bits of the existing DCI fields (e.g., the RV, the HARQ process number, and/or the NDI) may be empty/unused (e.g., to maintain the size of the DCI less than or equal to a legacy one). In some embodiments, the new DCI field may not exist simultaneously with at least part of the NDI, the RV, the HARQ process number, and/or other DCI fields. If the DCI fails to trigger/schedule UL data, the new DCI field may exist, while at least part of the NDI, the RV, the HARQ process number, and/or other DCI fields may cease to exist. If the DCI triggers/schedules UL data, the NDI, the RV, the HARQ process number, and/or other DCI fields may exist as configured, while the new DCI field may not exist.

C. Embodiment 3

In some embodiments, UL data may not be transmitted and/or CSI reporting may not occur (e.g., no uplink control information (UCI) to report in PUSCH and/or the CSI trigger state value indicated by DCI has a value of 0). Therefore, other fields of the DCI (e.g., time domain resource assignment (TDRA) field and/or frequency domain resource assignment (FDRA) field) may be used/combined to increase/improve SRS flexibility. For example, N bits of the TDRA and/or FDRA fields may be used/combined with the SRS request field (or other DCI fields) to increase/expand the number of trigger states. In another example, N bits of the TDRA and/or FDRA fields may be used (e.g., with other DCI fields) to select/identify/specify at least one value for one or more SRS parameters (e.g., from a plurality of candidate values). Therefore, one or more SRS parameters may correspond to a value of the TDRA and/or FDRA fields.

In certain specifications, a novel DCI field may replace the TDRA and/or FDRA fields. If the DCI fails to trigger CSI reporting and/or UL data, the new DCI field may not exist simultaneously with at least part of the TDRA and/or FDRA fields. If instead the DCI triggers/schedules UL data, the new DCI may not exist and/or the TDRA/FDRA fields can exist (e.g., as shown in specification 38.212). The TDRA and/or FDRA fields may be used when the DCI fails to trigger/cause UL data transmissions and/or CSI reporting.

Referring now to FIG. 11, depicted is an example approach 1100 for using a DCI to identify the value of one or more SRS parameters. In some embodiments, one or more configured candidate values of one or more SRS parameters may be associated/related/linked to a TDRA entry and/or a FDRA entry. The TDRA entry and/or the FDRA entry can indicate/correspond to a trigger state value of the TDRA and/or the FDRA. For example, higher level signaling (e.g., RRC signaling) may configure four slot offsets (e.g., t1, t2, t3, and/or t4) and/or other SRS parameters. Each configured slot offset may correspond to a TDRA trigger state value (e.g., values 0, 1, 2, and/or 3). For example, SRS slot offset t2 may be linked/associated/related to a TDRA trigger state value of 1. Therefore, if a DCI indicates that the TDRA trigger state has a value of 1, the SRS slot offset may correspond to a value of t2. The SRS request field of the DCI (or other DCI fields) may trigger/cause one or more SRS resources and/or SRS resource sets. In another example, if the DCI indicates/specifies that the TDRA trigger state value corresponds to 0, the SRS slot offset value may correspond to t1. In some embodiments, the TDRA (and/or the FDRA) trigger state value may indicate/specify at least one of a mappingType, a time offset (e.g., k2) between a PDCCH and a PUSCH, a startSymbolAndLength, and/or other information.

The slot offset is an illustrative example of at least one SRS parameter, and therefore, may be replaced/substituted by any one or more SRS parameters in the embodiments discussed herein. For example, the TDRA, the NDI, the RV, and/or the HARQ process number may be used to select/identify at least one set of SRS parameters from a plurality of configured candidate sets.

D. Embodiment 4

Figure 12:
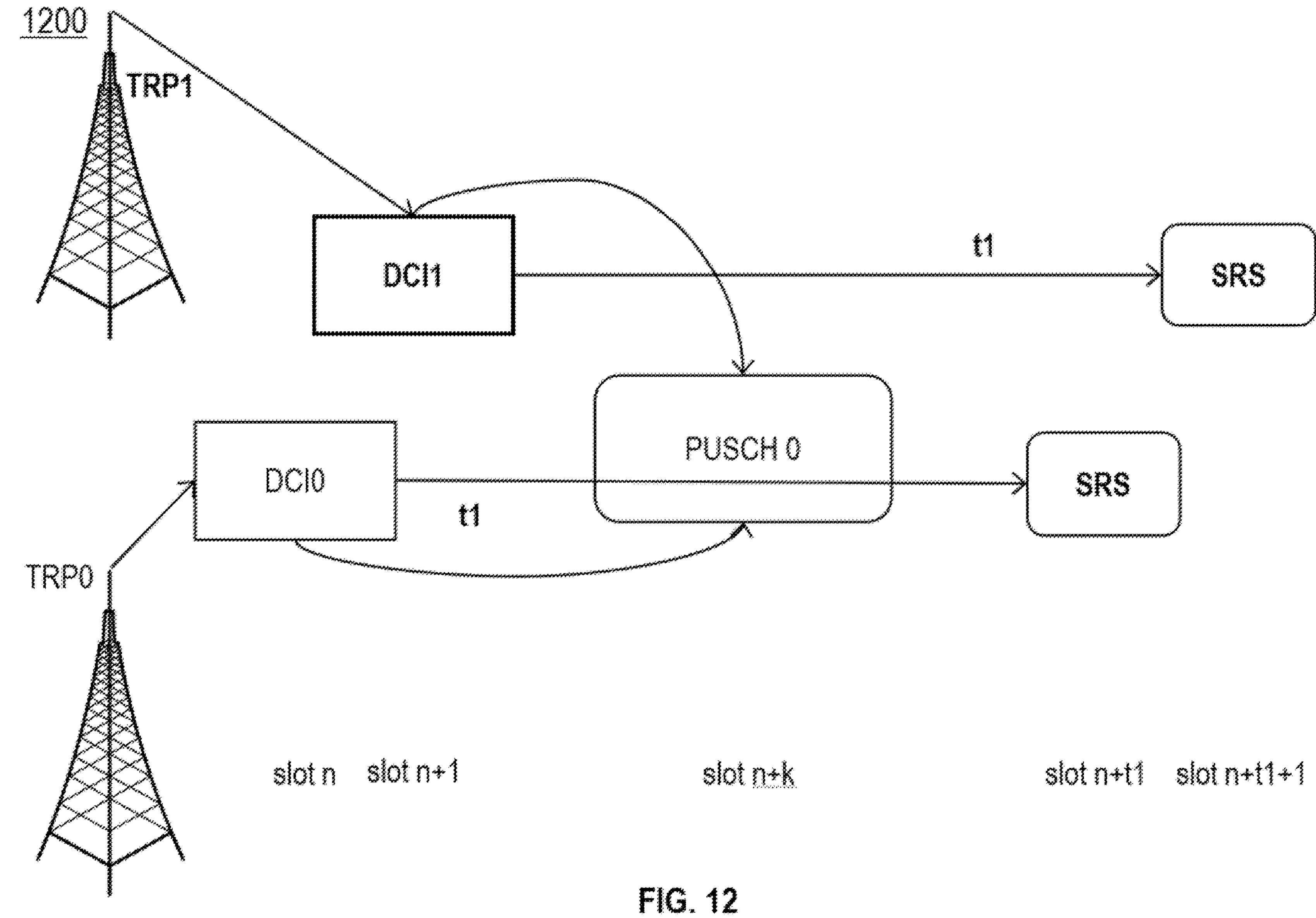
FIGS. 12-13 illustrate various approaches for using a time offset to schedule sounding reference signal (SRS) transmissions, in accordance with some embodiments of the present disclosure.

Referring now to FIG. 12, depicted is an example approach 1200 for using a time offset to schedule SRS transmissions. In certain frequency bands (e.g., high frequency bands), PDCCH (or other channels/transmissions) transmissions may use beamforming techniques (e.g., to compensate for a large path loss). However, the direction of the beam between the wireless communication node and the wireless communication device may face a blockage (e.g., by a human body). In some embodiments, PDCCH repetition (e.g., in different slots) may be supported/used/enabled to enhance the reliability of PDCCH transmissions. For example, one or more transmission and reception points (TRP) (e.g., TRP0 and/or TRP1) may send/transmit a DCI (e.g., DCI1 and/or DCI0) to schedule the same transmission (e.g., PUSCH and/or other UL channels). A DCI (e.g., DCI0) from a first TRP (e.g., TRP0) may trigger at least one SRS transmission in slot n+t1 (or other slots). Another DCI (e.g., DCI1) from a second TRP (e.g., TRP1) may trigger/cause another SRS transmission in slot n+t1+1 (or other slots). Each DCI (e.g., DCI0 and/or DCI1) can trigger a respective SRS transmission (e.g., in slot n+t1 and/or slot n+t1+1) if a same time offset (e.g., slot offset t1) is informed/indicated/specified/provided for each SRS resource and/or SRS resource set. Therefore, the wireless communication device may transmit/send/broadcast the same SRS repeatedly, and hence, may cause UL resource waste.

Figure 13:
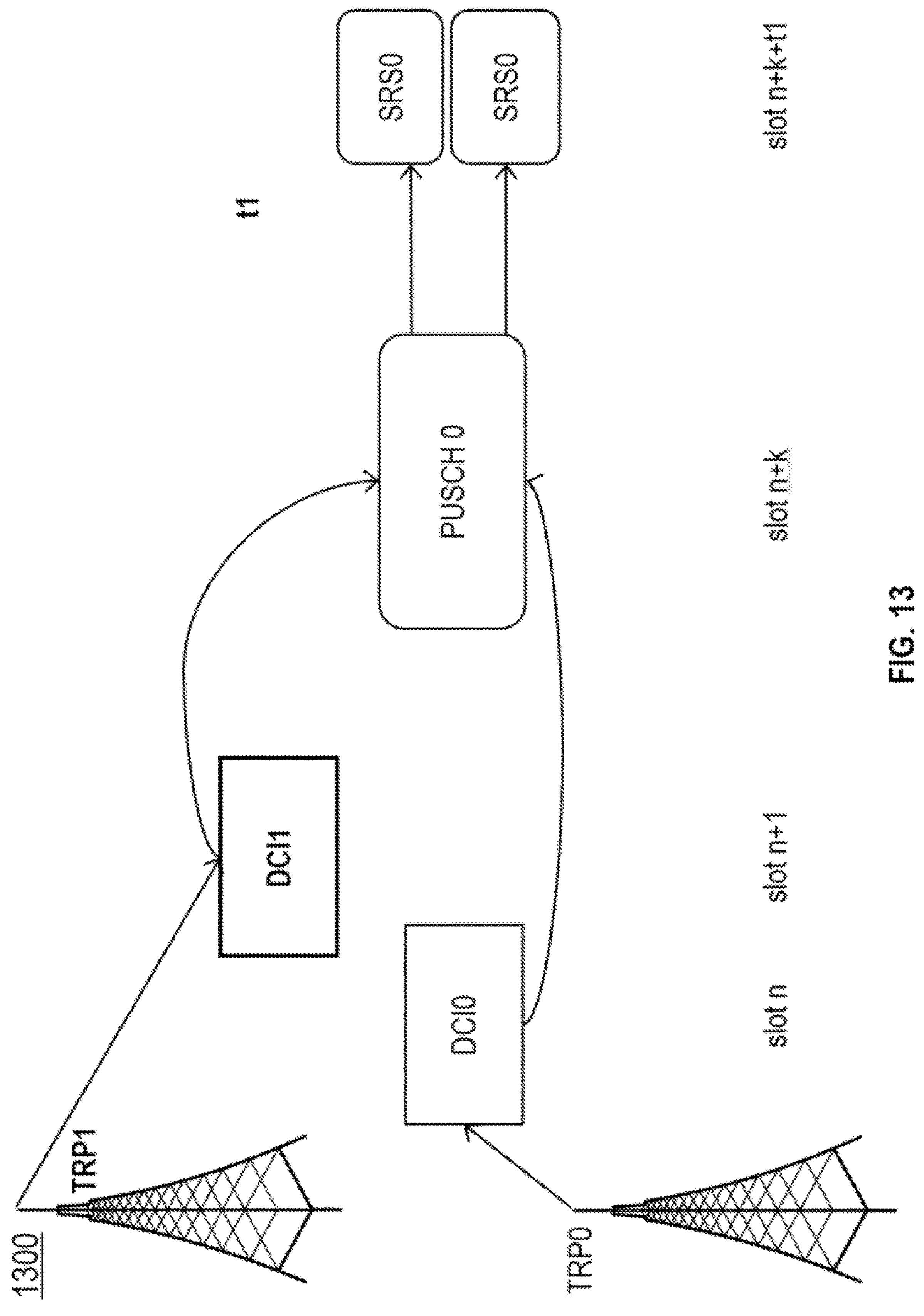

Referring now to FIG. 13 depicted is an example approach 1300 for using a time offset to schedule SRS transmissions. In some embodiments, the SRS slot offset may be defined/interpreted as indicating the time offset between a PUSCH/PDSCH transmission (and/or other transmissions) and a SRS transmission. The time offset may correspond to a slot offset, a symbol offset, or some other time duration offset. According to FIG. 12, four candidate SRS slot offsets (e.g., t1, t2, t3, and/or t4) may indicate/specify/provide the time interval between a PUSCH transmission and a SRS transmission. Therefore, the candidate SRS slot offsets (e.g., t1, t2, t3, and/or t4) can include negative values (e.g., the SRS transmission may precede the PUSCH transmission).

As shown in FIG. 13, the SRS slot offset can indicate the time interval between the PUSCH transmission and the SRS transmission. In some embodiments, at least two DCIs (e.g., DCI0 and/or DCI1) may schedule the same PUSCH transmission. Therefore, the at least two DCIs (e.g., DCI0 and/or DCI1) may trigger the SRS resources and/or SRS resource sets simultaneously. The wireless communication device may receive/obtain the at least two DCIs triggering the same SRS resource and/or SRS resource sets simultaneously (e.g., in the same time, the same slot, and/or the same OFDM symbols). Therefore, the wireless communication device may determine to send/transmit/broadcast the SRS resource and/or SRS resource set once (e.g., separate DCIs are triggering the same SRS).

In some embodiments, the location of one or more data transmissions scheduled by a DCI (e.g., PUSCH and/or PDSCH) may be associated/related with one or more SRS locations scheduled by the same DCI. The location may indicate/specify a time domain location and/or a frequency domain location. For example, in FIG. 13, the time domain location of the SRS (e.g., slot n+k+t1) may be associated to the time domain location of the PUSCH (e.g., slot n+k). Similarly, the frequency domain location of at least one SRS may be associated/related to the frequency domain location of at least one PUSCH/PDCSH (or other channels/transmissions). For example, a frequency domain start position of a PUSCH and/or PDSCH may be indicated/specified by the FDRA field of the DCI. The frequency domain start position of the PUSCH/PDSCH may correspond to the frequency domain start position of the SRS transmission (e.g., the frequency domain start positions can be the same). In another example, the PDSCH/PUSCH transmission overlaps with the SRS transmission in the frequency domain.

In certain specifications, the frequency hopping flag of the DCI can indicate/specify whether frequency hopping is enabled for a transmission (e.g., a PUSCH transmission or other transmissions). In some embodiments, the frequency hopping flag (or other flags) may be utilized to increase the flexibility of SRS transmissions. For instance, the frequency hopping flag may indicate/specify/provide the frequency hopping information of the SRS transmissions. In one example, SRS frequency hopping may be disabled in the slot if the frequency hopping flag has a value of 0 (or other values). In some embodiments, if the frequency hopping flag has a value of 0, RRC signaling (or other types of signaling) may configure/determine the SRS repetition factor R. In another example, SRS frequency hopping may be enabled in the slot (e.g., SRS repetition factor R has a value of 1) if the frequency hopping flag has a value of 1 (or other values).

E. Embodiment 5

In addition to DCI format 0_1 and/or DCI format 0_2, other DCI formats (e.g., DCI format 1_1, DCI format 1_2, and/or DCI format 2_3) may trigger/cause one or more SRS transmissions. In some embodiments, one or more candidate SRS parameter sets (e.g., time offsets and/or other values) may be configured for one or more SRS parameters. Each candidate SRS parameter set may correspond to a particular DCI format. A candidate SRS parameter set may include one or more candidate values for at least one SRS parameter (e.g., a time/slot offset). If a SRS resource and/or SRS resource set is triggered by a DCI, the candidate SRS parameter set corresponding to the DCI format may be used for the triggered SRS resource and/or SRS resource set.

Referring now to FIG. 14, depicted is an example approach 1400 for configuring one or more candidate SRS parameter sets per DCI format. For example, four candidate SRS parameter sets (e.g., candidate set 0, candidate set 1, candidate set 2, and/or candidate set 3) may be configured per DCI format (e.g., DCI format 0_1, DCI format 0_2, DCI format 1_1, and/or DCI format 1_2) for a SRS resource set (e.g., SRS resource set 0). If SRS resource set 0 is triggered by DCI format 0_1, candidate set 0 may be used. If SRS resource set 0 is triggered by DCI format 0_2, candidate set 1 may be used. If SRS resource set 0 is triggered by DCI format 1_1, candidate set 2 may be used. If SRS resource set 0 is triggered by DCI format 1_2, candidate set 3 may be used. In another example, candidate set 0 may include a slot offset with a value of k0, while candidate set 1 can include a slot offset with a value of k1. In the same example, candidate set 2 may include a slot offset with a value of k2, while candidate set 3 can include a slot offset that has a value of k3. If SRS resource set 0 is triggered by DCI format 0_1, candidate set 0 may be used, and therefore, a slot offset of k0 is utilized. If SRS resource set 0 is triggered by DCI format 0_2, a slot offset of k1 may be utilized (e.g., candidate set 1 can be used). If SRS resource set 0 is triggered by DCI format 1_1, a slot offset of k2 can be used (e.g., candidate set 2 may be utilized). If SRS resource set 0 is triggered by DCI format 1_2, a slot offset of k3 can be used (e.g., candidate set 3 may be utilized). One or more candidate sets (e.g., candidate sets 0 to 3) may include at least one value for one or more SRS parameters, such as values for frequency domain positions, values to indicate/enable frequency hopping, and/or values for other SRS parameters.

In some embodiments, a value of a parameter of a SRS transmission (e.g., SRS resource and/or SRS resource sets triggered by a DCI) can be associated/linked/related to at least one of the DCI format, the NDI field, the RV field, the HARQ process number field, the TDRA field, the FDRA field, the 'frequency hopping flag' field, and/or other DCI related information. If the SRS parameter is the time/slot offset, the time/slot offset may correspond to any one of interpretations in embodiment 1.

F. Methods for Sounding Reference Signal (SRS) Flexibility Enhancement

Figure 15:
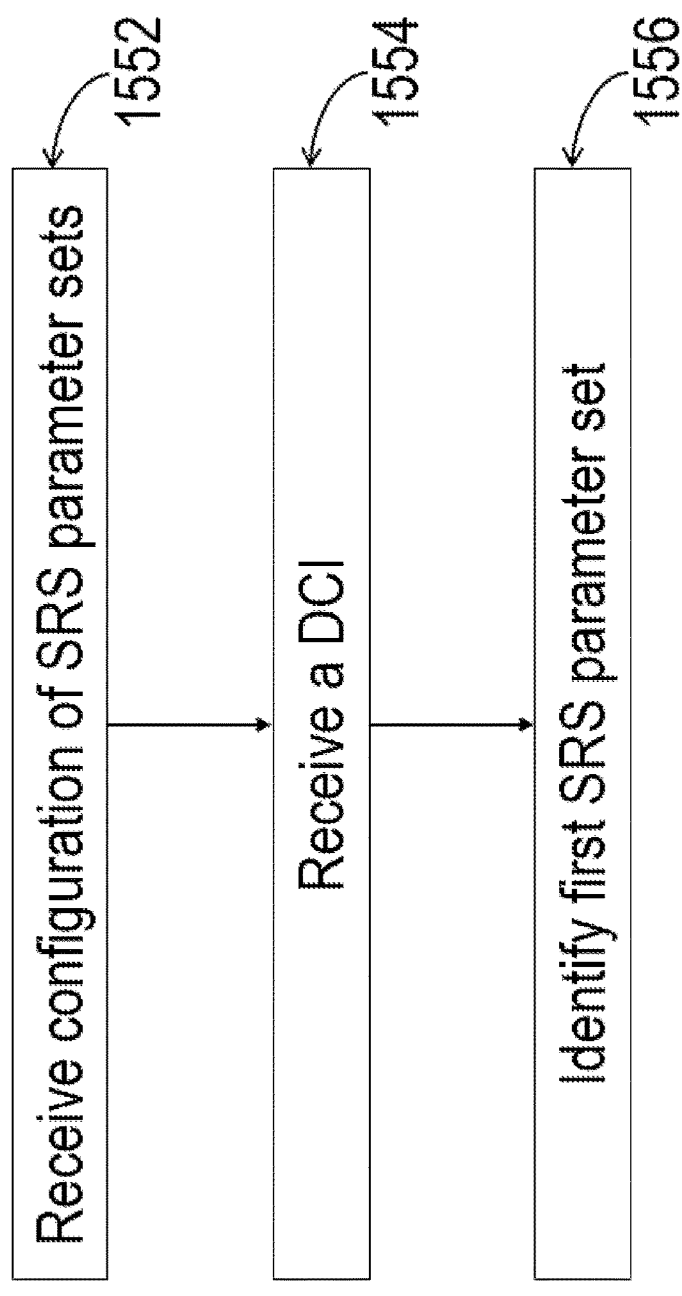
FIG. 15 illustrates a flow diagram of an example method for SRS flexibility enhancement, in accordance with an embodiment of the present disclosure.

FIG. 15 illustrates a flow diagram of a method 1550 for SRS flexibility enhancement. The method 1550 may be implemented using any of the components and devices detailed herein in conjunction with FIGS. 1-14. In overview, the method 1550 may include receiving a configuration of a plurality of SRS parameter sets (1552). The method 1550 may include receiving a DCI (1554). The method 1550 may include identifying a first SRS parameter set (1556).

Referring now to operation (1552), and in some embodiments, a wireless communication device (e.g., a UE) may receive/obtain a configuration of a plurality of SRS parameter sets. In some embodiments, the wireless communication node (e.g., a BS) may send/transmit/broadcast (e.g., via RRC signaling and/or other types of signaling) a configuration of a plurality of SRS parameter sets to the wireless communication device. The wireless communication device may receive (e.g., via RRC signaling, MAC-CE signaling, and/or other types of signaling) the configuration of the plurality of SRS parameter sets from the wireless communication node. For example, the wireless communication device may receive/obtain one or more configured values of a time offset for a SRS resource and/or SRS resource set via RRC signaling. The configuration of the plurality of SRS parameter sets may each be associated/related/linked with a corresponding DCI related information. For example, a RV bit value of 00 and/or a NDI bit value of 0 may be associated with a time offset value corresponding to k1 slots. In another example, a HARQ process number bit value of 001 and a NDI bit value of 0 may be associated with a time offset value corresponding to k3 slots (or other numbers of slots). In some embodiments, each of the SRS parameter sets may include a time offset (or other parameters) to determine a time interval. The time interval may correspond to the time interval between the SRS transmission (e.g., SRS resource and/or SRS resource set) and one of a PDCCH, a DCI, a PUSCH, a PDSCH, and/or other channels/transmissions. In some embodiments, the time offset can be specified/defined by a number of time slots and/or a number of symbols.

Referring now to operation (1554), and in some embodiments, the wireless communication device may receive/obtain a DCI from the wireless communication node. The wireless communication node may send/transmit/broadcast the DCI to the wireless communication device. The DCI may include one or more DCI fields (e.g., the NDI, the RV, the HARQ process number, and/or other DCI fields). The wireless communication device may use the values of the one or more DCI fields to identify/select at least one SRS parameters set (e.g., a time offset) for a SRS transmission. Responsive to receiving/obtaining the DCI, the wireless communication device may identify a first SRS parameter set for a SRS transmission.

Referring now to operation (1556), and in some embodiments, a wireless communication device may identify/determine a first SRS parameter set (e.g., a candidate set) for a SRS transmission (e.g., a SRS resource and/or SRS resource set). The wireless communication node may cause the wireless communication device to identify the first SRS parameter set for the SRS transmission. In one example, the wireless communication device may identify a first SRS parameter set (e.g., a slot offset with a value of k4) by using one or more DCI fields (e.g., the NDI, the RV, the HARQ process number, and/or other DCI fields). The wireless communication device may identify/select/determine the first SRS parameter set (e.g., a slot offset with a value of k4) from the plurality of SRS parameter sets (e.g., a plurality of slot offset values ranging from k1 to k8). The first SRS parameter set may be associated/related with first DCI related information identified by the DCI. For example, a SRS slot offset (or other SRS parameters of the first SRS parameter set) may be associated with a value of the TDRA (or other DCI related information). Therefore, if the DCI indicates/specifies that the TDRA has a value of 1 (or other values), the wireless communication device can identify that that SRS slot offset has a value of t2 (or other values).

In some embodiments, the first DCI related information may include a DCI format, a value of a NDI, a value of a RV, a value of HARQ process number, a value of TDRA, a value of FDRA, a value of frequency hopping flag, and/or other DCI fields. The wireless communication device may use the first DCI related information (e.g., the value of TDRA and/or FDRA) to identify/determine a first SRS parameter set. For example, a wireless communication device may use the bit value of the RV (e.g., 00) and/or the bit value of the NDI (e.g., 1) to identify the value of the time offset (e.g., k2 slots and/or symbols). In another example, the wireless communication device may identify a first SRS parameter set (e.g., candidate set 0, candidate set 1, and/or other candidate sets) based on the type of DCI format (e.g., DCI format 0_1, DCI format 0_2, and/or other DCI formats). In some embodiments, the wireless communication device may identify/select one or more SRS resources and/or SRS resource sets for the SRS transmission. The wireless communication node may cause the wireless communication device to perform the identification/selection. The wireless communication device may use a value of a SRS request field of the DCI and/or other DCI fields to identify one or more SRS resources and/or SRS resource sets. In some embodiments, an uplink transmission of data (e.g., PUSCH and/or other UL transmissions) may not be scheduled by the DCI (e.g., UL-SCH indicator in DCI has a value of 0). For example, if uplink transmissions are not scheduled by the DCI, the first DCI related information may include a value of a NDI, a value of a RV, and/or a value of HARQ process number.

In some embodiments, a bit value of the RV can form a MSB of the first DCI related information. A bit value of the NDI may form a LSB of the first DCI related information. Therefore, if the bit value of the RV corresponds to 00 and/or the bit value of the NDI corresponds to 1, the first DCI related information can have a value of 001. The first DCI related information (e.g., with a value of 001) may be associated to one or more SRS parameter sets (e.g., a slot offset value of k2). In some embodiments, a bit value of the HARQ process number may form a MSB of the first DCI related information. A bit value of the NDI can form a LSB of the first DCI related information. For example, if a bit value of the NDI has a value of 1 and/or the bit value of the HARQ process number has a value of 011, the first DCI related information may have a value of 0111 (e.g., can be associated with a slot offset value of k8). The first DCI related information may include the RV, the NDI, and/or HARQ process number if uplink transmission of data is not scheduled by the DCI.

In some embodiments, an order of bits of the first DCI related information, from MSB to LSB, may comprise a bit value of the RV, a bit value of the HARQ process number, and/or a bit value of the NDI. For instance, the first DCI related information may have a value of 100001 if the RV, the HARQ process number, and/or the NDI have bit values of 11,000, and/or 1 respectively. In some embodiments, an order of bits of the first DCI related information, from MSB to LSB, may comprise a bit value of the HARQ process number, a bit value of the RV and/or a bit value of the NDI. For example, the first DCI related information may have a value of 001101 if the HARQ process number, the RV, and/or the NDI have bit values of 001, 10, and/or 1 respectively.

In some embodiments, the wireless communication device may use a default SRS parameter set for the SRS transmissions. The wireless communication device may use the default SRS parameter set when uplink transmission of data is scheduled by the DCI. For example, if UL data is scheduled by the DCI, the first configured (e.g., via RRC signaling) candidate SRS parameter set from one or more configured candidate SRS parameter sets can be selected by default. In some embodiments, the first DCI related information may be provided via a DCI field (e.g., a new DCI field) that does not exist simultaneously with at least part of a NDI, a RV, a HARQ process number, and/or other DCI fields. For example, if UL data is not scheduled by the DCI, a new DCI field may provide the first DCI related information. If the new DCI field indicates/provides the first DCI related information, other DCI fields (e.g., a NDI, a RV, a HARQ process number, and/or other DCI fields) may not exist. In some embodiments, each SRS parameter set may be associated/linked/related with a corresponding value of the TDRA and/or FDRA. For example, a TDRA value of 2 may be associated with a SRS slot offset value of t3 (or other values).

In some embodiments, the first SRS parameter set and scheduled information about data transmission can be jointly indicated by a value of the TDRA and/or FDRA in the DCI. For example, N bits of the TDRA field and/or M bits of the FDRA field may be used/combined to indicate at least one configured (e.g., via RRC signaling) SRS parameter set from a plurality of configured SRS parameter sets. In some embodiments, a location (e.g., time domain locations and/or frequency domain locations) of the SRS transmission is associated with a location of a physical uplink shared channel (PUSCH) and/or physical downlink shared channel (PDSCH) transmission. For example, at least two DCIs (e.g., DCI0 and/or DCI1) may schedule a same data transmission (e.g., PUSCH, PDSCH, and/or other transmissions)

at a time domain location corresponding to slot n+k (or other slots). The wireless communication device may receive the at least two DCIs, wherein each DCI triggers a SRS resource and/or SRS resource set. Therefore, the wireless communication device may transmit/send at least one SRS resource and/or SRS resource set in the same time domain location (e.g., slot n+k+t1). The time domain location of the at least one SRS transmission (e.g., slot n+k+t1) may be associated with the time location of the data transmission (e.g., slot n+k).

In some embodiments, the wireless communication node may send/transmit a frequency hopping flag in the DCI to the wireless communication device. The wireless communication device may receive/obtain the frequency hopping flag in the DCI from the wireless communication node. In some embodiments, the frequency hopping flag can indicate frequency hopping information for the SRS transmissions. The frequency hopping flag can be indicative of one or more SRS parameters, such as a configured SRS repetition factor, or whether SRS frequency hopping in a slot is enabled. For example, if a frequency hopping flag has a value of 0 (or other values), SRS frequency hopping may be disabled in a slot. If the frequency hopping flag has a value of 1 (or other values), SRS frequency hopping may be enabled.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

receiving, by a wireless communication device from a wireless communication node, a configuration of a plurality of sounding reference signal (SRS) parameter sets each associated with a corresponding downlink control information (DCI) related information;

receiving, by the wireless communication device from the wireless communication node, a DCI including a value for a resource assignment field, wherein uplink transmission of data is not scheduled by the DCI, wherein the DCI includes two or more fields, comprising a DCI format, a new data indicator (NDI), a redundancy value (RV), a hybrid automatic repeat request (HARQ) process number, a time domain resource assignment (TDRA), a frequency domain resource assignment (FDRA), or a frequency hopping flag;

identifying, by the wireless communication device, according to the value for the resource assignment field of the DCI received from the wireless communication node, first DCI related information from the corresponding DCI related information associated with each of the plurality of SRS parameter sets, wherein a bit value of a first field of the two or more fields forms a most significant bit (MSB) of the first DCI related information and a bit value of a second field of the two or more fields forms a least significant bit (LSB) of the first DCI related information; and identifying, by the wireless communication device for a SRS transmission, a first SRS parameter set associated with the first DCI related information, from the plurality of SRS parameter sets.

2. The method of claim 1, wherein each of the SRS parameter sets includes a time offset to determine a time interval between the SRS transmission and one of: a physical downlink control channel (PDCCH), a DCI, a physical uplink shared channel (PUSCH) or a physical downlink shared channel (PDSCH).

3. The method of claim 2, wherein the time offset is specified by a number of time slots or by a number of symbols.

4. The method of claim 1, wherein the first DCI related information includes at least one of: the DCI format, a value of the NDI, a value of the RV, a value of the HARQ process number, a value of the TDRA, a value of the FDRA, or a value of the frequency hopping flag, of the DCI.

5. The method of claim 4, comprising:

identifying, by the wireless communication device for the SRS transmission, one or more SRS resources or SRS resource sets, according to a value of a SRS request field of the DCI.

6. The method of claim 4, wherein each SRS parameter set is associated with a corresponding value of the TDRA or the FDRA.

7. The method of claim 4, wherein a bit value of the RV forms the MSB of the first DCI related information, and a bit value of the NDI forms the LSB of the first DCI related information.

8. The method of claim 7, wherein an order of bits of the first DCI related information from MSB to LSB comprises the bit value of the RV, the bit value of the HARQ process number and the bit value of the NDI.

9. The method of claim 7, wherein an order of bits of the first DCI related information from MSB to LSB comprises the bit value of the HARQ process number, the bit value of the RV and the bit value of the NDI.

10. The method of claim 4, wherein a bit value of the HARQ process number forms the MSB of the first DCI related information, and a bit value of the NDI forms the LSB of the first DCI related information.

11. The method of claim 4, wherein the first DCI related information is provided via a DCI field that does not exist simultaneously with at least part of at least one of: the NDI, the RV, or the HARQ process number, in the DCI.

12. The method of claim 1, comprising:

using, by the wireless communication device for the SRS transmission, a default SRS parameter set when uplink transmission of data is scheduled by the DCI.

13. The method of claim 1, wherein the first SRS parameter set and scheduled information about data transmission, are jointly indicated by a value of the TDRA or the FDRA in the DCI.

14. The method of claim 1, wherein a location of the SRS transmission is associated with a location of a physical uplink shared channel (PUSCH) or physical downlink shared channel (PDSCH) transmission.

15. The method of claim 1, comprising:

receiving, by the wireless communication device from the wireless communication node, the frequency hopping flag in the DCI, the frequency hopping flag indicative of at least one of: a configured SRS repetition factor, or whether SRS frequency hopping in a slot is enabled.

16. A method comprising:

sending, by wireless communication node to a wireless communication device, a configuration of a plurality of sounding reference signal (SRS) parameter sets each associated with a corresponding downlink control information (DCI) related information;

sending, by the wireless communication node to the wireless communication device, a DCI including a value for a resource assignment field, wherein uplink transmission of data is not scheduled by the DCI, wherein the DCI includes two or more fields, comprising a DCI format, a new data indicator (NDI), a redundancy value (RV), a hybrid automatic repeat request (HARQ) process number, a time domain resource assignment (TDRA), a frequency domain resource assignment (FDRA), or a frequency hopping flag; and causing the wireless communication device to:

identify, according to the value for the resource assignment field of the DCI, first DCI related information from the corresponding DCI related information associated with each of the plurality of SRS parameter sets, wherein a bit value of a first field of the two or more fields forms a most significant bit (MSB) of the first DCI related information and a bit value of a second field of the two or more fields forms a least significant bit (LSB) of the first DCI related information; and identify, for a SRS transmission, a first SRS parameter set associated with the first DCI related information, from the plurality of SRS parameter sets.

17. The method of claim 16, wherein each of the SRS parameter sets includes a time offset to determine a time interval between the SRS transmission and one of: a physical downlink control channel (PDCCH), a DCI, a physical uplink shared channel (PUSCH) or a physical downlink shared channel (PDSCH).

18. A wireless communication device comprising:

at least one processor configured to:

receive, via a receiver from a wireless communication node, a configuration of a plurality of sounding reference signal (SRS) parameter sets each associated with a corresponding downlink control information (DCI) related information;

receive, via the receiver from the wireless communication node, a DCI including a value for a resource assignment field, wherein uplink transmission of data is not scheduled by the DCI, wherein the DCI includes two or more fields, comprising a DCI format, a new data indicator (NDI), a redundancy value (RV), a hybrid automatic repeat request (HARQ) process number, a time domain resource assignment (TDRA), a frequency domain resource assignment (FDRA), or a frequency hopping flag;

identify, according to the value for the resource assignment field of the DCI received from the wireless communication node, first DCI related information from the corresponding DCI related information associated with each of the plurality of SRS parameter sets, wherein a bit value of a first field of the two or more fields forms a most significant bit (MSB) of the first DCI related information and a bit value of a second field of the two or more fields forms a least significant bit (LSB) of the first DCI related information; and identify, for a SRS transmission, a first SRS parameter set associated with the first DCI related information, from the plurality of SRS parameter sets.

19. A wireless communication node, comprising: at least one processor configured to:

send, via transmitter, a configuration of a plurality of sounding reference signal (SRS) parameter sets each associated with a corresponding downlink control information (DCI) related information;

send, via the transmitter to the wireless communication device, a DCI including a value for a resource assignment field, wherein uplink transmission of data is not scheduled by the DC, wherein the DCI includes two or more fields, comprising a DCI format, a new data indicator (NDI), a redundancy value (RV), a hybrid automatic repeat request (HARQ) process number, a time domain resource assignment (TDRA), a frequency domain resource assignment (FDRA), or a frequency hopping flag; and cause the wireless communication device to:

identify, according to the value for the resource assignment field of the DCI, first DCI related information from the corresponding DCI related information associated with each of the plurality of SRS parameter sets, wherein a bit value of a first field of the two or more fields forms a most significant bit (MSB) of the first DCI related information and a bit value of a second field of the two or more fields forms a least significant bit (LSB) of the first DCI related information; and identify, for a SRS transmission, a first SRS parameter set associated with the first DCI related information, from the plurality of SRS parameter sets.

* * * * *